United States Patent
Lin et al.

(10) Patent No.: US 10,373,050 B2
(45) Date of Patent: Aug. 6, 2019

(54) FIXED POINT NEURAL NETWORK BASED ON FLOATING POINT NEURAL NETWORK QUANTIZATION

(71) Applicant: QUALCOMM Incorporated, San Diego, CA (US)

(72) Inventors: Dexu Lin, San Diego, CA (US); Venkata Sreekanta Reddy Annapureddy, San Diego, CA (US); David Edward Howard, San Diego, CA (US); David Jonathan Julian, San Diego, CA (US); Somdeb Majumdar, Mission Viejo, CA (US); William Richard Bell, II, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 947 days.

(21) Appl. No.: 14/920,099

(22) Filed: Oct. 22, 2015

(65) Prior Publication Data

US 2016/0328646 A1 Nov. 10, 2016

Related U.S. Application Data

(60) Provisional application No. 62/159,079, filed on May 8, 2015.

(51) Int. Cl.
| | |
|---|---|
| G06N 3/08 | (2006.01) |
| G06N 3/04 | (2006.01) |
| G06N 3/10 | (2006.01) |
| G06K 9/46 | (2006.01) |
| G06N 3/06 | (2006.01) |

(52) U.S. Cl.
CPC ............ *G06N 3/08* (2013.01); *G06K 9/4628* (2013.01); *G06N 3/04* (2013.01); *G06N 3/10* (2013.01); *G06N 3/06* (2013.01)

(58) Field of Classification Search
CPC .. G06N 3/08; G06N 3/04; G06N 3/06; G06N 3/10; G06K 9/4628
USPC .......................................... 706/25
See application file for complete search history.

(56) References Cited

U.S. PATENT DOCUMENTS

| | | | | |
|---|---|---|---|---|
| 5,732,697 | A | * | 3/1998 | Zhang .................. G06T 7/0012 600/300 |
| 6,144,977 | A | | 11/2000 | Giangarra et al. |
| 7,593,804 | B2 | | 9/2009 | Grichnik et al. |
| 7,917,333 | B2 | | 3/2011 | Grichnik et al. |

(Continued)

OTHER PUBLICATIONS

Vanhoucke et al., "Improving the speed of neural networks on CPUs", 2011.*

(Continued)

*Primary Examiner* — Dave Misir
(74) *Attorney, Agent, or Firm* — Seyfarth Shaw LLP

(57) ABSTRACT

A method of quantizing a floating point machine learning network to obtain a fixed point machine learning network using a quantizer may include selecting at least one moment of an input distribution of the floating point machine learning network. The method may also include determining quantizer parameters for quantizing values of the floating point machine learning network based at least in part on the at least one selected moment of the input distribution of the floating point machine learning network to obtain corresponding values of the fixed point machine learning network.

22 Claims, 9 Drawing Sheets

(56) References Cited

U.S. PATENT DOCUMENTS 8,442,927 B2 5/2013 Chakradhar et al.
2015/0170020 A1 6/2015 Garimella

OTHER PUBLICATIONS

Vanhoucke et al., "Improving the speed of neural networks on CPUs", 2011. (previously provided). (Year: 2011).*
Girod B., "Quantization", Jun. 30, 2014 (as first posted as determined in Wayback Machine). (Year: 2014).*
Anwar S., et al., "Fixed Point Optimization of Deep Convolutional Neural Networks for Object Recognition," 2015 IEEE International Conference on Acoustics, Speech and Signal Processing (ICASSP), Apr. 1, 2015 (Apr. 1, 2015), pp. 1131-1135, XP055284772, DOI: 10.1109/ICASSP.2015.7178146 ISBN: 978-1-4673-6997-8.
Courbariaux M., et al., "Low Precision Storage for Deep Learning," Apr. 3, 2015 (Apr. 3, 2015), pp. 1-9, XP055284795, Retrieved from the Internet: URL:https://arxiv.org/pdf/1412.7024v4.pdf [retrieved on Jun. 30, 2016].
Gupta S., et al., "Deep Learning with Limited Numerical Precision," Feb. 9, 2015, 10 pages.
International Search Report and Written Opinion—PCT/US2016/027589—ISA/EPO—dated Jul. 18, 2016.
Jian B., et al., "Neural Networks with Limited Precision Weights and its Application in Embedded Systems," Proceedings of the 2nd International Workshop on Education Technology and Computer Science (ETCS'10), Mar. 6, 2010 (Mar. 6, 2010), pp. 86-91, XP031673183, D0i: 10.1109/ETCS.2010.448 the whole document.
Lin D.D., et al., "Fixed Point Quantization of Deep Convolutional Networks," Nov. 19, 2015 (Nov. 19, 2015), pp. 1-10, XP055284812, Retrieved from the Internet: URL:https://arxiv.org/pdf/1511.06393v3.pdf [retrieved on Jun. 30, 2016].
Sung W., et al., "Simulation-based Word-length Optimization Method for Fixed-point Digital Signal Processing Systems," IEEE Transactions on Signal Processing, IEEE Service Center, New York, NY, US,Dec. 1, 1995 (Dec. 1, 1995),vol. 43, No. 12, pp. 3087-3090, XP002369850, ISSN: 1053-587X, DOI: 10.1109/78.476465.
Hwang K., et al., "Fixed-Point Feedforward Deep Neural Network Design Using Weights +1, 0, and −1," IEEE Workshop on Signal Processing Systems (SiPS), 2014, 6 pages.

\* cited by examiner

Probability distribution function (PDF)
400

Activation Values 500

Weights 550

FIXED POINT NEURAL NETWORK BASED ON FLOATING POINT NEURAL NETWORK QUANTIZATION

CROSS-REFERENCE TO RELATED APPLICATION

The present application claims the benefit of U.S. Provisional Patent Application No. 62/159,079, filed on May 8, 2015, and titled "FIXED POINT NEURAL NETWORK BASED ON FLOATING POINT NEURAL NETWORK QUANTIZATION," the disclosure of which is expressly incorporated by reference herein in its entirety.

BACKGROUND

Field

Certain aspects of the present disclosure generally relate to machine learning and, more particularly, to quantizing a floating point neural network to obtain a fixed point neural network.

Background

An artificial neural network, which may comprise an interconnected group of artificial neurons (e.g., neuron models), is a computational device or represents a method to be performed by the computational device. Individual nodes in an artificial neural network may emulate biological neurons by taking input data and performing simple operations on the data. The results of the simple operations performed on the input data are selectively passed on to other neurons. The output of each node is called its "activation." Weight values are associated with each vector and node in the network, and these values constrain how input data is related to output data. The weight values associated with individual nodes are also known as biases. Theses weight values are determined by the iterative flow of training data through the network (e.g., weight values are established during a training phase in which the network learns how to identify particular classes by their typical input data characteristics).

Convolutional neural networks are a type of feed-forward artificial neural network. Convolutional neural networks may include collections of neurons that each have a receptive field and that collectively tile an input space. Convolutional neural networks (CNNs) have numerous applications. In particular, CNNs have broadly been used in the areas of pattern recognition and classification.

Deep learning architectures, such as deep belief networks and deep convolutional networks, are layered neural networks architectures in which the output of a first layer of neurons becomes an input to a second layer of neurons, the output of a second layer of neurons becomes an input to a third layer of neurons, and so on. Deep neural networks may be trained to recognize a hierarchy of features and so they have increasingly been used in object recognition applications. Like convolutional neural networks, computation in these deep learning architectures may be distributed over a population of processing nodes, which may be configured into one or more computational chains. These multi-layered architectures may be trained one layer at a time and may be fine-tuned using back-propagation.

Other models are also available for object recognition. For example, support vector machines (SVMs) are learning tools that can be applied for classification. Support vector machines include a separating hyperplane (e.g., decision boundary) that categorizes data. The hyperplane is defined by supervised learning. A desired hyperplane increases the margin of the training data. In other words, the hyperplane should have the greatest minimum distance to the training examples.

Although these solutions achieve excellent results on a number of classification benchmarks, their computational complexity can be prohibitively high. Additionally, training of these models may be challenging.

SUMMARY

A method of quantizing a floating point machine learning network to obtain a fixed point machine learning network using a quantizer may include selecting at least one moment of an input distribution of the floating point machine learning network. The method may also include determining quantizer parameters for quantizing values of the floating point machine learning network based at least in part on the at least one selected moment of the input distribution of the floating point machine learning network to obtain corresponding values of the fixed point machine learning network.

An apparatus for quantizing a floating point machine learning network to obtain a fixed point machine learning network using a quantizer may include means for selecting at least one moment of an input distribution of the floating point machine learning network. The apparatus may also include means for determining quantizer parameters for quantizing values of the floating point machine learning network based at least in part on the at least one selected moment of the input distribution of the floating point machine learning network to obtain corresponding values of the fixed point machine learning network.

An apparatus for quantizing a floating point machine learning network to obtain a fixed point machine learning network using a quantizer may include a memory unit and at least one processor coupled to the memory unit. The at least one processor may be configured to select at least one moment of an input distribution of the floating point machine learning network. The at least one processor may be further configured to determine quantizer parameters for quantizing values of the floating point machine learning network based at least in part on the at least one selected moment of the input distribution of the floating point machine learning network to obtain corresponding values of the fixed point machine learning network.

A non-transitory computer-readable medium having program code recorded thereon for quantizing a floating point machine learning network to obtain a fixed point machine learning network using a quantizer when executed by a processor may include program code to select at least one moment of an input distribution of the floating point machine learning network. The non-transitory computer-readable medium may further include program code to determine quantizer parameters for quantizing values of the floating point machine learning network based at least in part on the at least one selected moment of the input distribution of the floating point machine learning network to obtain corresponding values of the fixed point machine learning network.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
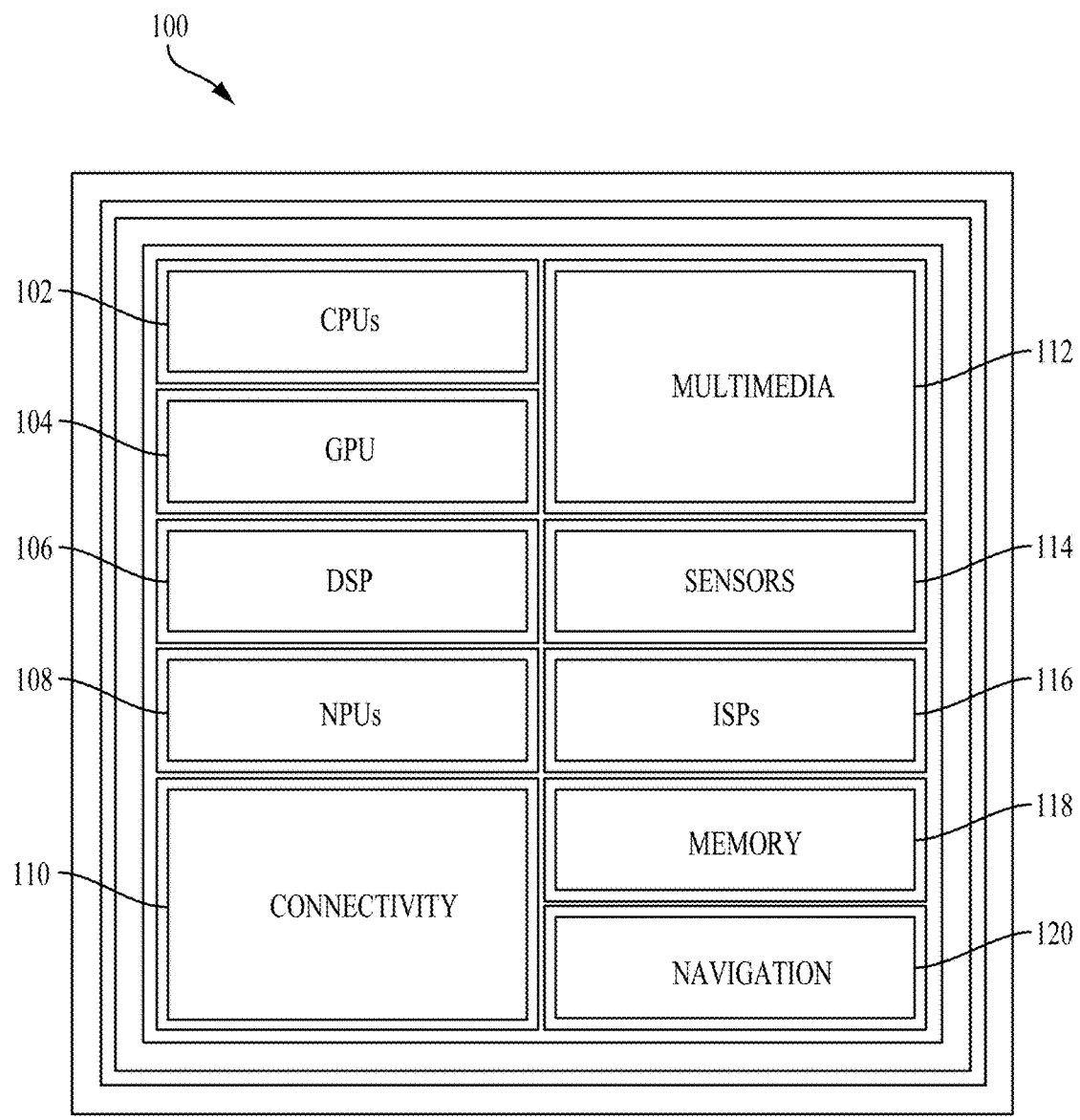
FIG. 1 illustrates an example implementation of designing a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Quantization is a process of mapping a set of input values to a smaller set of values. For example, the input values may be rounded to a given unit of precision. Specifically, in one example, the conversion of floating point numbers to fixed point numbers may be a process of quantization.

In some artificial neural networks (ANNs), such as a deep convolutional network (DCN), quantization may be applied to activations of the normalization layer; weights, biases, and activations of the fully connected layer; and/or weights, biases, and activations of the convolution layer. Furthermore, for DCNs, quantization may not be applied to the pooling layer if maximum pooling is specified; and/or the neuron layer if rectified linear units (ReLU) are specified.

Aspects of the present disclosure are directed to improving quantization of the weights, biases, and/or activations in ANNs. That is, aspects of the present disclosure are directed to quantizing weights, biases, and/or activation values in ANNs to improve the tradeoff between performance and complexity when implementing an ANN with fixed point numbers.

FIG. 1 illustrates an example implementation of the aforementioned reduction of computation complexity by quantizing a floating point neural network to obtain a fixed point neural network using a system-on-a-chip (SOC) 100, which may include a general-purpose processor (CPU) or multi-core general-purpose processors (CPUs) 102 in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a dedicated memory block 118, or may be distributed across multiple blocks. Instructions executed at the general-purpose processor 102 may be loaded from a program memory associated with the CPU 102 or may be loaded from a dedicated memory block 118.

The SOC 100 may also include additional processing blocks tailored to specific functions, such as a GPU 104, a DSP 106, a connectivity block 110, which may include fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs), and/or navigation 120, which may include a global positioning system.

The SOC 100 may be based on an ARM instruction set. In an aspect of the present disclosure, the instructions loaded into the general-purpose processor 102 may comprise code for quantizing a floating point neural network to obtain a fixed point neural network. The instructions loaded into the general-purpose processor 102 may also comprise code for providing a fixed point representation when quantizing weights, biases and activation values in the network.

Figure 2:
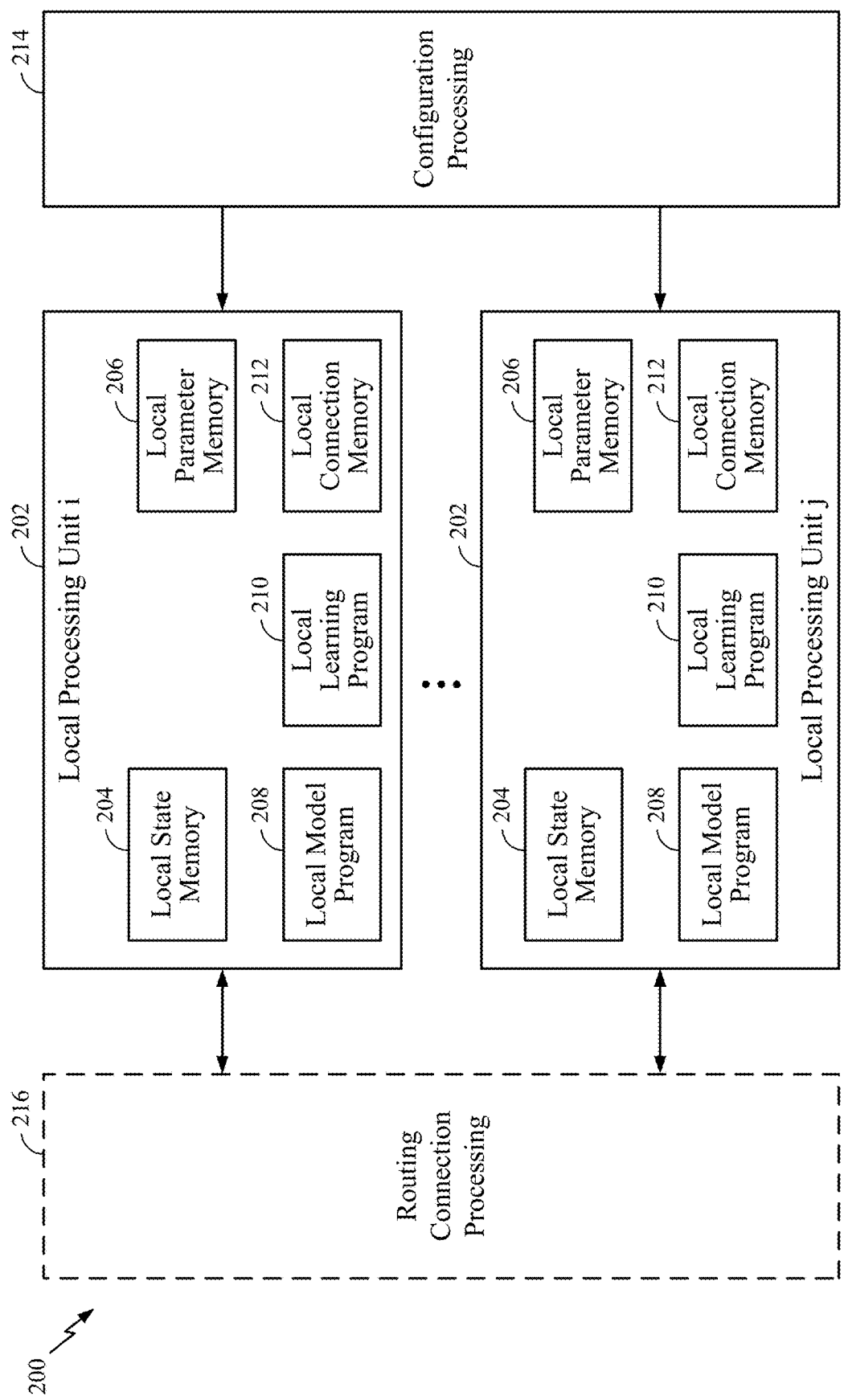
FIG. 2 illustrates an example implementation of a system in accordance with aspects of the present disclosure.

FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may comprise a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 3A:
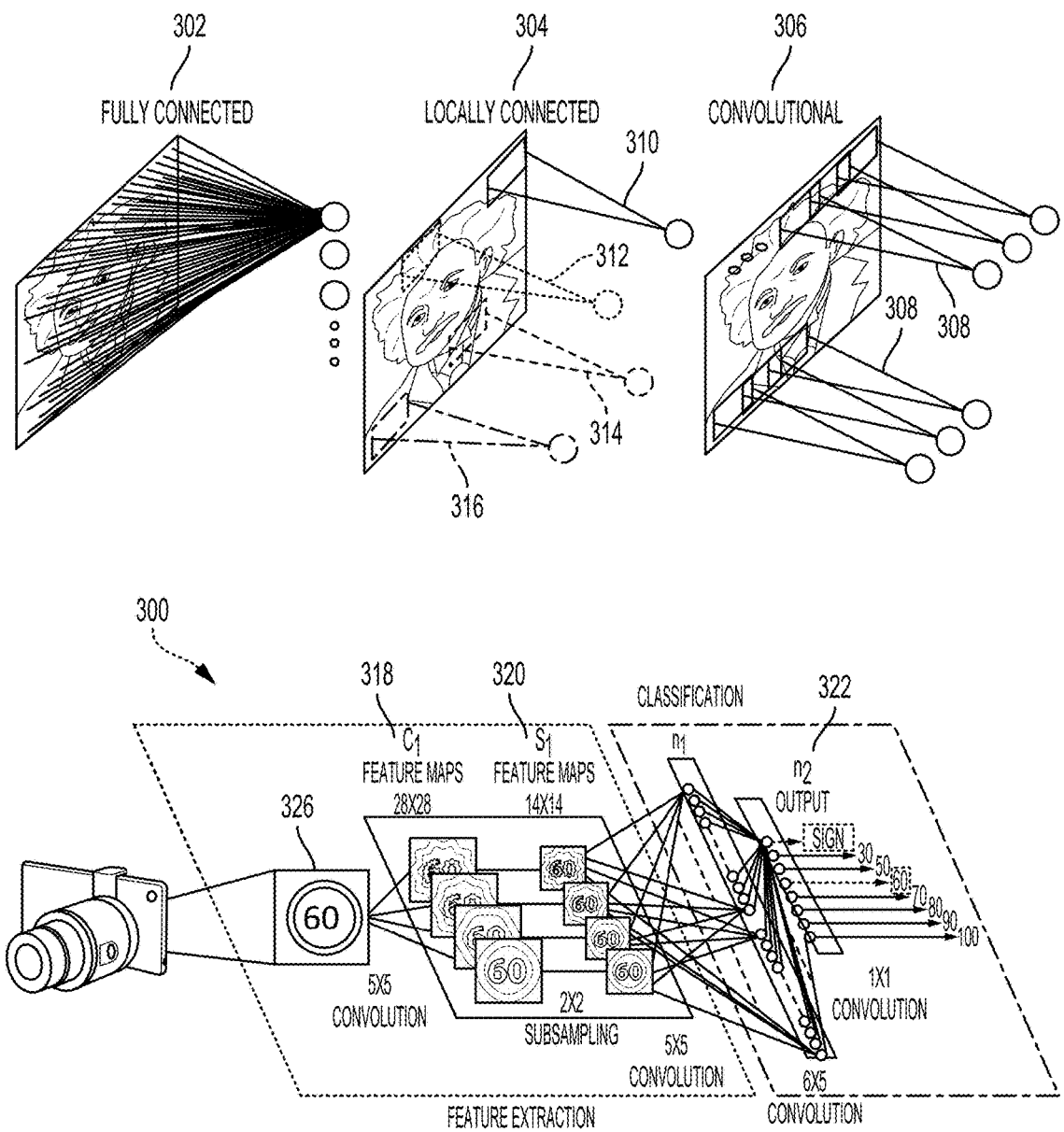
FIG. 3A is a diagram illustrating a neural network in accordance with aspects of the present disclosure.

Referring to FIG. 3A, the connections between layers of a neural network may be fully connected 302 or locally connected 304. In a fully connected network 302, a neuron in a first layer may communicate its output to every neuron in a second layer, so that each neuron in the second layer will receive input from every neuron in the first layer. Alternatively, in a locally connected network 304, a neuron in a first layer may be connected to a limited number of neurons in the second layer. A convolutional network 306 may be locally connected, and is further configured such that the connection strengths associated with the inputs for each neuron in the second layer are shared (e.g., 308). More generally, a locally connected layer of a network may be configured so that each neuron in a layer will have the same or a similar connectivity pattern, but with connections strengths that may have different values (e.g., 310, 312, 314, and 316). The locally connected connectivity pattern may give rise to spatially distinct receptive fields in a higher layer, because the higher layer neurons in a given region may receive inputs that are tuned through training to the properties of a restricted portion of the total input to the network.

Locally connected neural networks may be well suited to problems in which the spatial location of inputs is meaningful. For instance, a network 300 designed to recognize visual features from a car-mounted camera may develop high layer neurons with different properties depending on their association with the lower versus the upper portion of the image. Neurons associated with the lower portion of the image may learn to recognize lane markings, for example, while neurons associated with the upper portion of the image may learn to recognize traffic lights, traffic signs, and the like.

A DCN may be trained with supervised learning. During training, a DCN may be presented with an image, such as a cropped image of a speed limit sign, and a "forward pass" may then be computed to produce an output 322. The output 322 may be a vector of values corresponding to features such as "sign," "60," and "100." The network designer may want the DCN to output a high score for some of the neurons in the output feature vector, for example the ones corresponding to "sign" and "60" as shown in the output 322 for a network 300 that has been trained. Before training, the output produced by the DCN is likely to be incorrect, and so an error may be calculated between the actual output and the target output. The weights of the DCN may then be adjusted so that the output scores of the DCN are more closely aligned with the target.

To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error. This manner of adjusting the weights may be referred to as "back-propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN may be presented with new images and a forward pass through the network may yield an output 322 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer 318 and 320, with each element of the feature map (e.g., 320) receiving input from a range of neurons in the previous layer (e.g., 318) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3B:
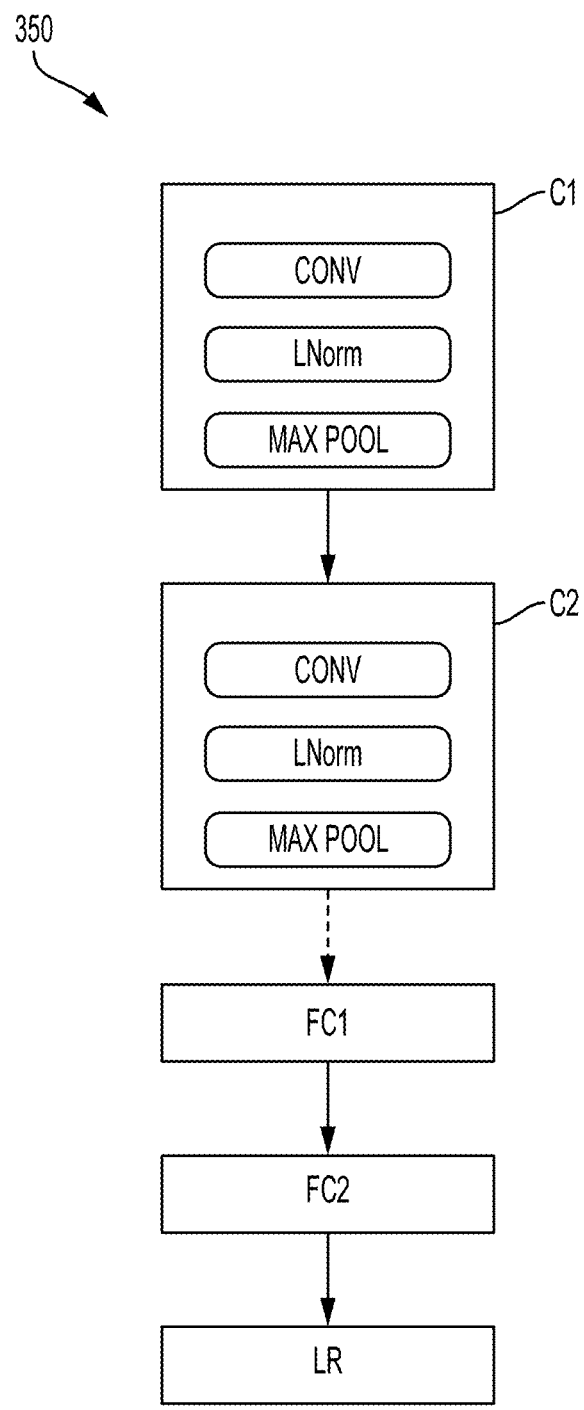
FIG. 3B is a block diagram illustrating an exemplary deep convolutional network (DCN) in accordance with aspects of the present disclosure.

FIG. 3B is a block diagram illustrating a deep convolutional network 350. The deep convolutional network 350 may include multiple different types of layers based on connectivity and weight sharing. As shown in FIG. 3B, the deep convolutional network 350 includes multiple convolution blocks (e.g., C1 and C2). Each of the convolution blocks may be configured with a convolution layer, a normalization layer (LNorm), and a pooling layer. The convolution layers may include one or more convolutional filters, which may be applied to the input data to generate a feature map. Although only two convolution blocks are shown, the present disclosure is not so limiting, and instead, any number of convolutional blocks may be included in the deep convolutional network 350 according to design preference. The normalization layer may be used to normalize the output of the convolution filters. For example, the normalization layer may provide whitening or lateral inhibition. The pooling layer may provide down sampling aggregation over space for local invariance and dimensionality reduction.

The parallel filter banks, for example, of a deep convolutional network may be loaded on a CPU 102 or GPU 104 of an SOC 100, optionally based on an ARM instruction set, to achieve high performance and low power consumption. In alternative embodiments, the parallel filter banks may be loaded on the DSP 106 or an ISP 116 of an SOC 100. In addition, the DCN may access other processing blocks that may be present on the SOC, such as processing blocks dedicated to sensors 114 and navigation 120.

The deep convolutional network 350 may also include one or more fully connected layers (e.g., FC1 and FC2). The deep convolutional network 350 may further include a logistic regression (LR) layer. Between each layer of the deep convolutional network 350 are weights (not shown) that are to be updated. The output of each layer may serve as an input of a succeeding layer in the deep convolutional network 350 to learn hierarchical feature representations from input data (e.g., images, audio, video, sensor data and/or other input data) supplied at the first convolution block C1.

In one configuration, a machine learning model, such as a neural model, is configured for quantizing a floating point neural network to obtain a fixed point neural network. The model includes a reducing means and/or balancing means. In one aspect, the reducing means and/or balancing means may be the general-purpose processor 102, program memory associated with the general-purpose processor 102, memory block 118, local processing units 202, and or the routing connection processing units 216 configured to perform the functions recited. In another configuration, the aforementioned means may be any module or any apparatus configured to perform the functions recited by the aforementioned means.

According to certain aspects of the present disclosure, each local processing unit 202 may be configured to determine parameters of the model based upon desired one or more functional features of the model, and develop the one or more functional features towards the desired functional features as the determined parameters are further adapted, tuned and updated.

Fixed Point Neural Network Based on Floating Point Neural Network Quantization

Floating point representation of weights, biases, and/or activation values in artificial neural networks (ANN) may increase the complexity of hardware and/or software implementations of the network. In some cases, a fixed point representation of a network, such as a deep convolutional network (DCN) or an artificial neural network, may provide an improved performance-complexity tradeoff. Aspects of the present disclosure are directed to quantizing weights, biases, and activation values in artificial neural networks to improve the tradeoff between performance and complexity when implementing the network using fixed point numbers.

Fixed point numbers may be specified for using less complex software and/or hardware designs at the cost of reduced accuracy because floating point numbers have a greater dynamic range compared to fixed point numbers. Converting floating point numbers to fixed point numbers through the process of quantization may decrease the complexity of hardware and/or software implementations. The floating point numbers may assume a single-precision binary format including a sign bit, an 8-bit exponent, and a 23-bit fraction component.

Aspects of the disclosure are directed to using the Q number format to represent fixed point numbers. Still, other formats may be considered. The Q number format is represented as Qm.n, where m is a number of bits for an integer part and n is a number of bits for a fraction part. In one configuration, m does not include a sign bit. Each Qm.n format may use an m+n+1 bit signed integer container with n fractional bits. In one configuration, the range is [$-(2^m)$, $2^m - 2^{-n}$] and the resolution is $2^{-n}$. For example, a Q14.1 format number may use sixteen bits. In this example, the range is [$-2^{14}$, $2^{14}-2^1$] (e.g., [−16384.0, +16383.5]) and the resolution is $2^1$ (e.g., 0.5).

In one configuration, an extension of the Q number format is specified to support instances where the resolution is greater than one or the maximum range is less than one. In some cases, a negative number of fractional bits may be specified for a resolution greater than one. Additionally, a negative number of integer bits may be specified for a maximum range less than one.

A deep convolutional network (DCN) is one example of an artificial neural network in which quantization may be applied according to aspects of the present disclosure. Quantization may be applied to activations of the normalization layer; weights, biases, and activations of the fully connected layer; and/or weights, biases, and activations of the convolution layer. Quantization, however, need not be applied to the pooling layer if max pooling is specified, and/or the neuron layer if rectified linear units (ReLU) are specified. Aspects of the present disclosure are directed to improving quantization of the weights, biases, and/or activations in artificial neural networks by applying various optimizations.

Figure 4:
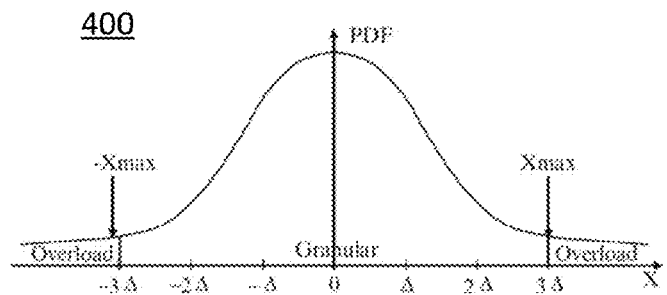
FIG. 4 illustrates an exemplary probability distribution function showing a distribution to define a range of a fixed point representation.

Quantization efficiency in artificial neural networks, according to aspects of the present disclosure, may be better understood by a review of quantization according to the probability distribution function 400 shown in FIG. 4. For example, an input to the quantizer may be uniformly distributed over [$X_{min}$, $X_{max}$], where $X_{min}$ and $X_{max}$ define the range of a fixed point representation. When the input to the quantizer is uniformly distributed over [$X_{min}$, $X_{max}$], quantization noise is:

$$\sigma_q^2 = \frac{\Delta^2}{12}, \text{ where } \sigma_q^2 = \text{noise of quantizer,} \quad (1)$$

$$q \text{ and } \Delta = \text{step size}$$

signal power is:

$$\sigma_x^2 = \frac{(X_{max} - X_{min})^2}{12}, \text{ where } \sigma_x^2 = \text{power of signal } x \quad (2)$$

and a signal to quantization noise ratio (SQNR), assuming M is the number of integer bits is:

$$SQNR(dB) = 20\log_{10}\left(\frac{X_{max} - X_{min}}{\Delta}\right) \quad (3)$$
$$= 20\log_{10} M$$
$$= 6.02\log_2 M$$

Figure 5A:
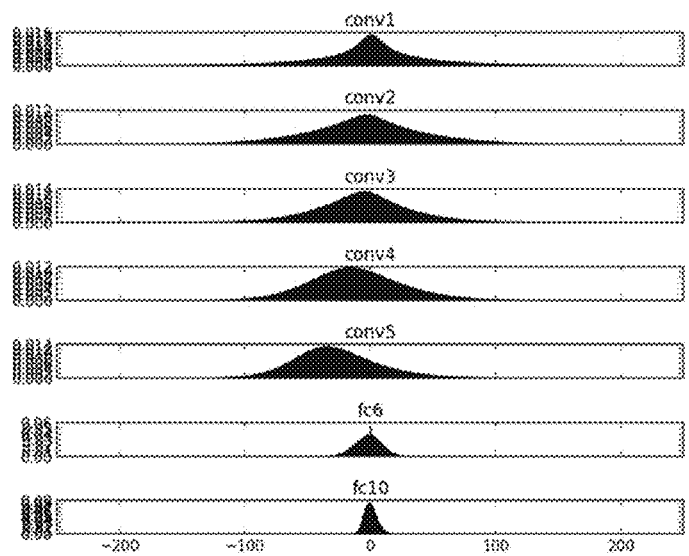
FIGS. 5A and 5B illustrate distributions of activation values and weights in different layers of an exemplary deep convolutional network.
Figure 5B:
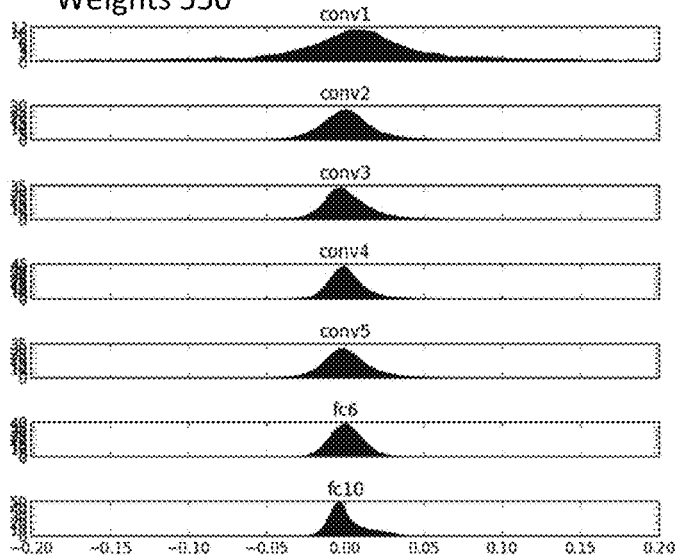

FIGS. 5A and 5B illustrate distributions of activation values and weights in different layers of an exemplary deep convolutional network. FIG. 5A shows the activation values for convolution layers zero to five (conv0, . . . , conv5) and fully connected layers one and two (fc1, fc2). FIG. 5B shows the weights 550 for convolution layers one to five (conv1, . . . , conv5) and fully connected layers one and two (fc1, fc2). Application of quantization to the weights, biases, and activation values in artificial neural networks includes the determination of a step size. For example, the step sizes of a symmetric uniform quantizer for Gaussian, Laplacian, and Gamma distributions may be calculated with a deterministic function of the standard deviation of the input distribution, if it is assumed that the distributions have zero mean and unit variance. Accordingly, aspects of the present disclosure are directed toward modifications of the weight and/or activation value calculations so that the distributions have a zero mean (e.g., an approximately zero mean). In one configuration, both the weights and activation values are assumed to have Gaussian distributions, however, other distributions are also contemplated.

In aspects of the present disclosure, modifications of the weight and/or activation value calculations so that the distributions have a zero mean is performed by removing the mean. In one configuration, quantization may be performed after the mean value ($\mu$) of the input distribution is removed. The removal of the mean value may have a greater effect if the distribution has a large mean value.

Figure 6A:
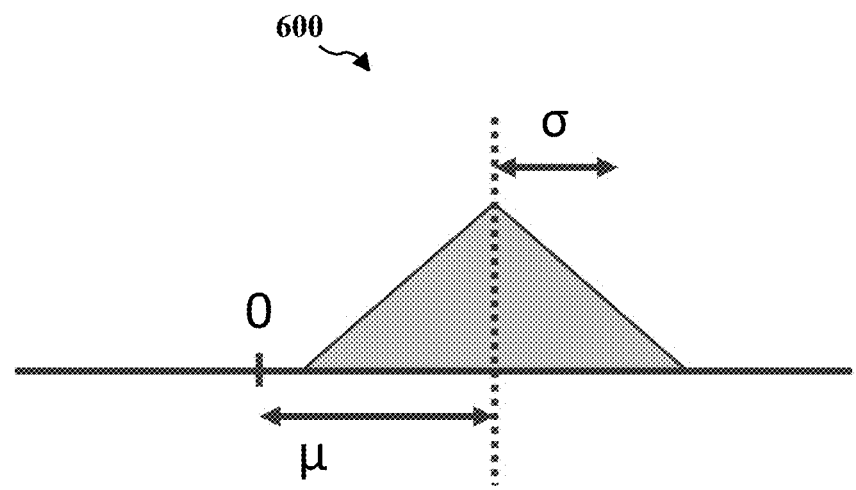
FIG. 6A illustrates an input distribution for an exemplary deep convolutional network.

FIG. 6A illustrates an input distribution 600 for an exemplary deep convolutional network. In this example, the input distribution 600 includes a variance ($\sigma$) and a mean value ($\mu$). Aspects of the present disclosure are directed towards specifying a zero mean ($\mu=0$) for the distributions of weights, biases and activation values, for example, as shown in FIG. 6B.

Figure 6B:
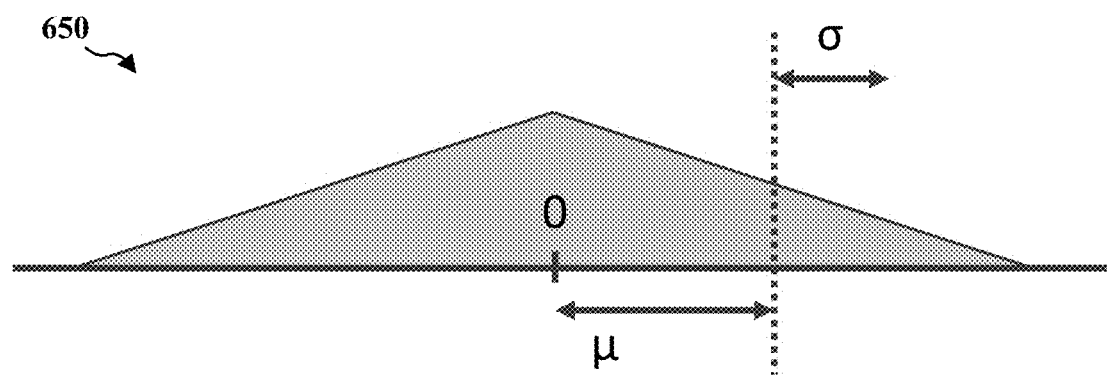
FIG. 6B illustrates a modified input distribution for an exemplary deep convolutional network according to aspects of the present disclosure.

FIG. 6B illustrates a modified input distribution 650 for an exemplary deep convolutional network. In this configuration, the mean value ($\mu$) is added to the standard deviation (variance ($\sigma$)) to reduce computational overhead when determining the range of encoding, such that:

$$\text{Input std } \sigma' = |\mu| + \sigma \quad (4)$$

The modified input distribution 650 of FIG. 6B, however, involves additional bits to represent the modified input distribution 650 having the zero mean. That is, in this configuration, the complexity of fixed point computation is reduced at the expense of an increase in a specified bit-width due to the modified input distribution 650. For example, if $|\mu|<\sigma$, the increase in the specified bit-width is less than 1 extra bit for each quantity being quantized.

Figure 7A:
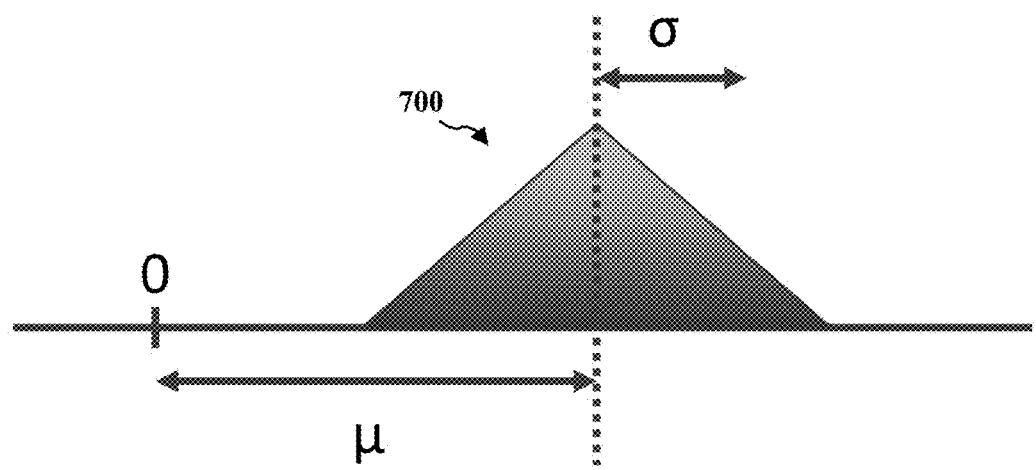
FIGS. 7A and 7B illustrate conversion of a first machine learning network into a second machine learning network by incorporating a mean value of a distribution of activation values into a network bias of the second machine learning network according to aspect of the present disclosure.
Figure 7B:
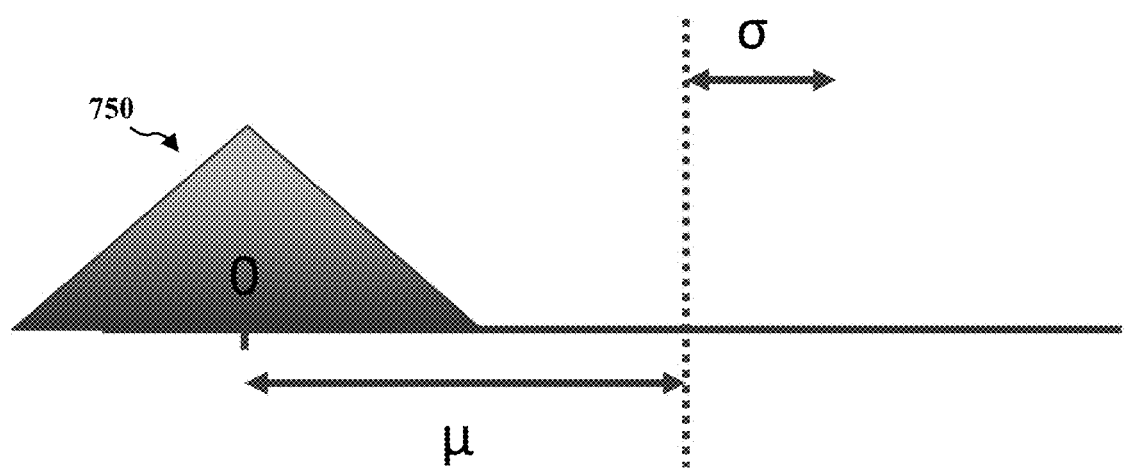

FIGS. 7A and 7B illustrate a method of converting a first machine learning network into a second machine learning network by incorporating a mean value of a distribution of activation values of the first machine learning network into a network bias of the second machine learning network. FIG. 7A illustrates an input distribution 700 of activation values for an exemplary deep convolutional network also having a mean ($\mu$) and a variance ($\sigma$). In aspects of the present disclosure, modifications of the input distribution 700 of the activation value calculations are performed so that the activation values have a zero mean. In this aspect of the disclosure, modifications of the weight and/or activation value calculations is performed by absorbing the mean value ($\mu$) into a bias of the artificial neural network, for example, as shown in FIG. 7B.

FIG. 7B illustrates a modified input distribution 750 of activation values for an exemplary deep convolutional network having the variance ($\sigma$) and the mean ($\mu$). In this configuration, the mean ($\mu$) is absorbed into the bias values of the deep convolutional network model. Absorbing the mean ($\mu$) into the bias values may reduce the computational burden of mean removal. Absorbing the mean ($\mu$) into the bias of the deep convolutional network model essentially removes the mean activations without an extra computational burden. Calculation of the modified bias values may be performed as follows.

In some cases, when an ANN has multiple layers, the activation value for the ith neuron in layer l+1 may be computed as follows:

$$a_i^{(l+1)} = \sum_{j=1}^{N} w_{i,j}^{(l+1)} a_j^{(l)} + b_i^{(l+1)} \quad (5)$$

where (l) represents the lth layer, N represents number of additions, $w_{i,j}$ represents the weight from neuron j in layer l to neuron i, and $b_i$ represents the bias.

The activations, $a_j^l$, may be represented as the sum of the mean component $\mu^{(l)}$ and a zero-mean portion $\hat{a}_j^{(l)}$, then:

$$a_j^{(l)} = \mu^{(l)} + \hat{a}_j^{(l)} \quad (6)$$

$$a_i^{(l+1)} = \sum_{j=1}^{N} w_{i,j}^{(l+1)} \hat{a}_j^{(l)} + b_i^{(l+1)} + \mu^{(l)} \cdot \sum_{j=1}^{N} w_{i,j}^{(l+1)} \text{ New bias values} \quad (7)$$

$$\hat{a}_i^{(l+1)} = a_i^{(l+1)} - \mu^{(l+1)} = \sum_{j=1}^{N} w_{i,j}^{(l+1)} \hat{a}_j^{(l)} + \boxed{b_i^{(l+1)} + \mu^{(l)} \cdot \sum_{j=1}^{N} w_{i,j}^{(l+1)} - \mu^{(l+1)}} \quad (8)$$

In one configuration, the bias values are modified to specify a zero-mean throughout the network for the distributions of activations. In addition, a non-linear activation function is modified when the mean value is incorporated into the network bias. In this configuration, the original bias values $b_i^{(l)}$ are replaced with modified values $\hat{b}_i^{(l)}$:

$$\hat{b}_i^{(l)} = b_i^{(l)} + \mu^{(l-1)} \cdot \sum_{j=1}^{N} w_{i,j}^{(l)} - \mu^{(l)} \quad (9)$$

The resulting network has zero mean activations:

$$\hat{a}_i^{(l+1)} = \sum_{j=1}^{N} w_{i,j}^{(l+1)} \hat{a}_j^{(l)} + \hat{b}_i^{(l+1)} \quad (10)$$

For some layers, for example at the output of the ANN, non-zero-mean output activations may be specified, such that:

$$a_i^{(l+1)} = \sum_{j=1}^{N} w_{i,j}^{(l+1)} \hat{a}_j^{(l)} + \tilde{b}_i^{(l+1)} \quad (11)$$

where $\tilde{b}_i^{(l)} = b_i^{(l)} + \mu^{(l-1)} \cdot \sum_{j=1}^{N} w_{i,j}^{(l)} \quad (12)$ Application of quantization to the weights, biases, and activation values in artificial neural networks may include a fixed point convertor. In some cases, $w_{i,j}^{(l)}$ and $b_i^{(l)}$ are known for an ANN model. Furthermore, $a_j^{(l)}$ may be measured from a floating point simulation. Thus, in one configuration, the floating point to fixed point model convertor may compute and assign a new value to $\hat{b}_i^{(l)}$ by measuring the mean activations, $\mu^{(l)}$, at each layer and calculating the new value as follows:

$$\hat{b}_i^{(l)} = b_i^{(l)} + \mu^{(l-1)} \cdot \sum_{j=1}^{N} w_{i,j}^{(l)} - \mu^{(l)} \quad (13)$$

In some cases, it is assumed that weights in the ANN have a substantially zero mean for each observation. Thus, it is assumed that the aforementioned example is directed towards activation values. Still, the aforementioned example may also be applied to weight values. Application to weight values may include shifting activation values to create a zero-mean distribution for each layer of a fixed point machine learning network. When the activations throughout the network are shifted to create a zero-mean distribution for each layer, if a subsequent non-linear function is applied to the activations, the coordinate of the function is shifted by the same amount such that the output is a shift of the original output without a bias modification. That is, the quantization process includes shifting a coordinate of any non-linear function applied to a shifted activation value by an amount corresponding to the shifted activation value.

Application of quantization to the weights, biases, and activation values in artificial neural networks includes the determination of a step size. For fixed point representations, the step sizes may be limited to powers of 2. Determining the step size that is a power of the 2 may correspond to determining the number of fractional bits in the fixed point number representation. Equations for determining step size may be specified as:

$$\sigma' = |\mu| + \sigma \text{ or } \sigma' = \sigma \text{ or } \sigma' = \sqrt{\mu^2 + \sigma^2} \quad (14)$$

where μ and σ are mean and standard deviation of the input to compute an effective sigma value σ'. Next, an effective step size is computed based on the effective sigma value σ' as follows:

$$S_{float} = \sigma' \times C_{scaling}(w) \times \alpha \quad (15)$$

where $S_{float}$ is the computed step size in floating point, $C_{scaling(w)}$ is a scaling constant for bit-width w and α is the adjustment factor for the step size. Finally, a closest power of 2 is determined for the step size as follows:

$$n = -S_{float} \lceil \log_2 s_{float} \rceil \quad (16)$$

where n is the number of fractional bits that may be specified to represent the quantizer input and $2^{-n}$ may be specified as the step size. Other rounding functions may be used to obtain an integer n in addition to $\lceil \cdot \rceil$ (ceiling operation), including round (•) and $\lfloor \cdot \rfloor$ (floor operation).

A scaling function and adjustment factor function $C_{scaling(w)}$ from EQUATION (15) may be specified as a function of the bit-width (W) according to table I.

TABLE I

Uniform Quantizer for Gaussian Distribution

| w | 1 | 2 | 3 | 4 | 5 | 6 | 7 | 8 |
|---|---|---|---|---|---|---|---|---|
| $c_{scaling}$ (w) | 1.596 | 0.996 | 0.586 | 0.335 | 0.188 | 0.104 | 0.057 | 0.031 |

The additional adjustment factor, α, is a value that may be adjusted to improve the classification performance. For example, α may be specified to a value different from 1 in certain scenarios, such as: (1) the input distribution is not Gaussian (e.g., potentially longer tails); or (2) the calculated fixed point representation for the DCN does not agree with the representation calculated based on consideration of the signal to quantization noise ratio (SQNR). In an exemplary DCN model directed towards scene detection, an a different from 1, such as α=1.5, improves performance.

In addition, the step size adjustment factor α may be specified differently throughout the model. For example, α may be specified individually for weights and activations of each layer. In addition, the weights and biases may have very different dynamic ranges. For example, weights and biases may be specified to have different Q number representations and different bit-widths. Additionally, the bit-width of weights and biases in the same layer may be the same. In one configuration, for a given layer, weights have a format of Q 3.18 and biases have a format of Q 6.9.

In one configuration, after quantizing the floating point model into a fixed point model, the fixed point network is fine-tuned via additional training to further improve the network performance. Fine-tuning may include training via back-propagation. Furthermore, the step size and Q number representations identified in the floating point to fixed point conversion may carry over to the fine-tuned network. In this example, additional step-size optimization is not specified. A quantizer for an ANN may maintain the fidelity of the network while reducing the use of resources. For an exemplary network, there may be little to no difference in terms of accuracy between a 32-bit floating point network implementation compared with a 16-bit fixed point network implementation. A fixed point implementation of an ANN based on the disclosed quantizer design may reduce model size, processing time, memory bandwidth, and power consumption.

Figure 8:
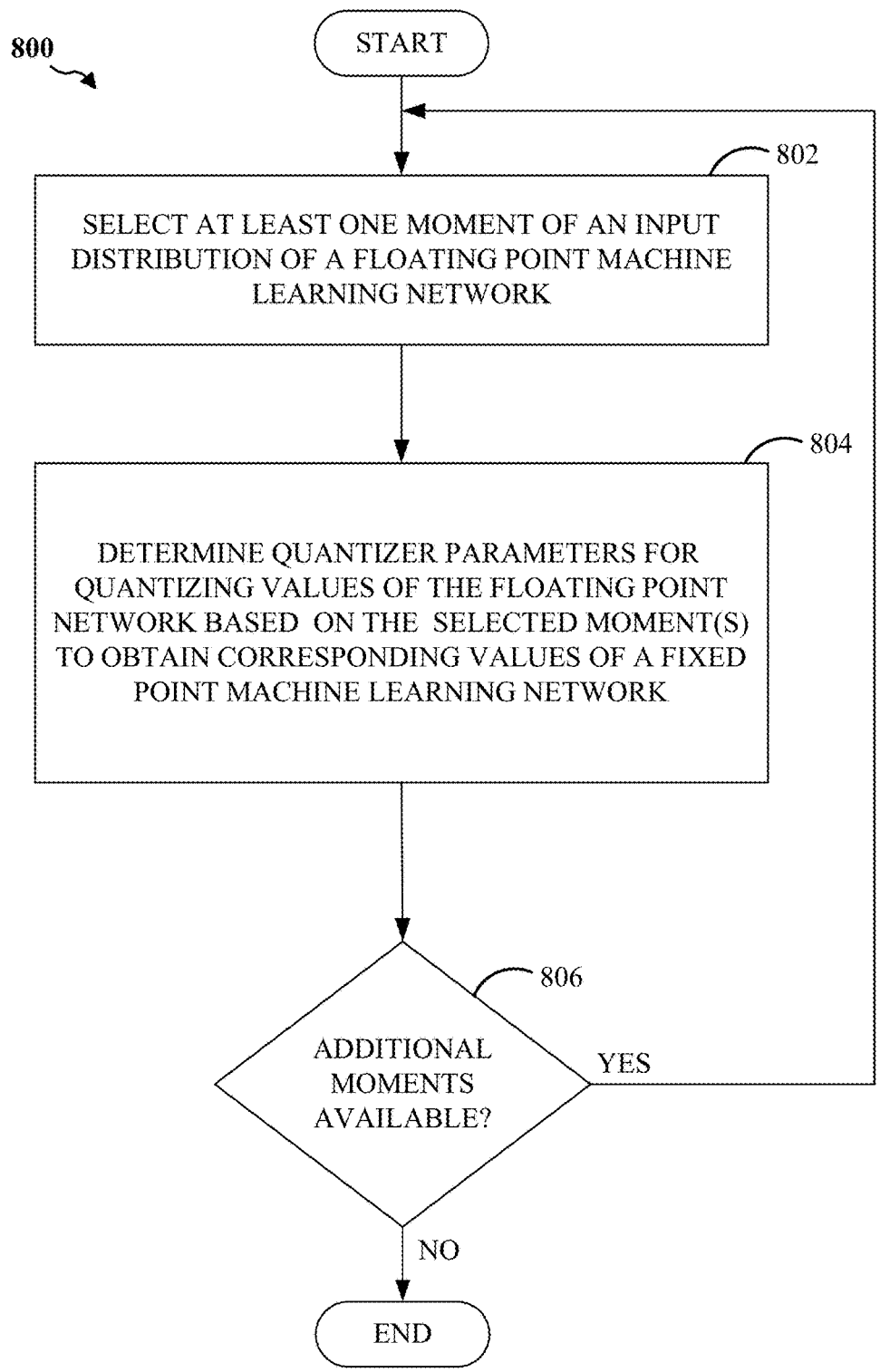
FIG. 8 illustrates a method of quantizing a floating point machine learning network to obtain a fixed point machine learning network using a quantizer according to aspects of the present disclosure.

FIG. 8 illustrates a method 800 of quantizing a floating point machine learning network to obtain a fixed point machine learning network using a quantizer according to aspects of the present disclosure. In block 802, at least one moment of an input distribution of a floating point machine learning network is selected. The at least one moment of the input distribution of the floating point machine learning network may include a mean, a variance or other like moment of the input distribution. In block 804, quantizer parameters for quantizing values of the floating point machine learning network are determined based on the selected moment of the input distribution of the floating point machine learning network. At block 806, it is determined whether additional moments are available for the input distribution. If so, blocks 802 and 804 may be repeated for each moment of the input distribution including, for example, the mean, the variance or other like moments of the input distribution.

In aspects of the present disclosure, the determining of the quantizer parameters for quantizing values of the floating point machine learning network is performed to obtain corresponding values of the fixed point machine learning network. The quantizer parameters for quantizing values of the floating point machine learning network include a maximum dynamic encoding range, a quantizer step size, a bit width, a signed/unsigned indicator value or other like quantizing parameter of the fixed point machine learning network. In addition, the corresponding values of the fixed point machine learning network may include, but are not limited to, a bias, a weight, and/or activation values.

Figure 9:
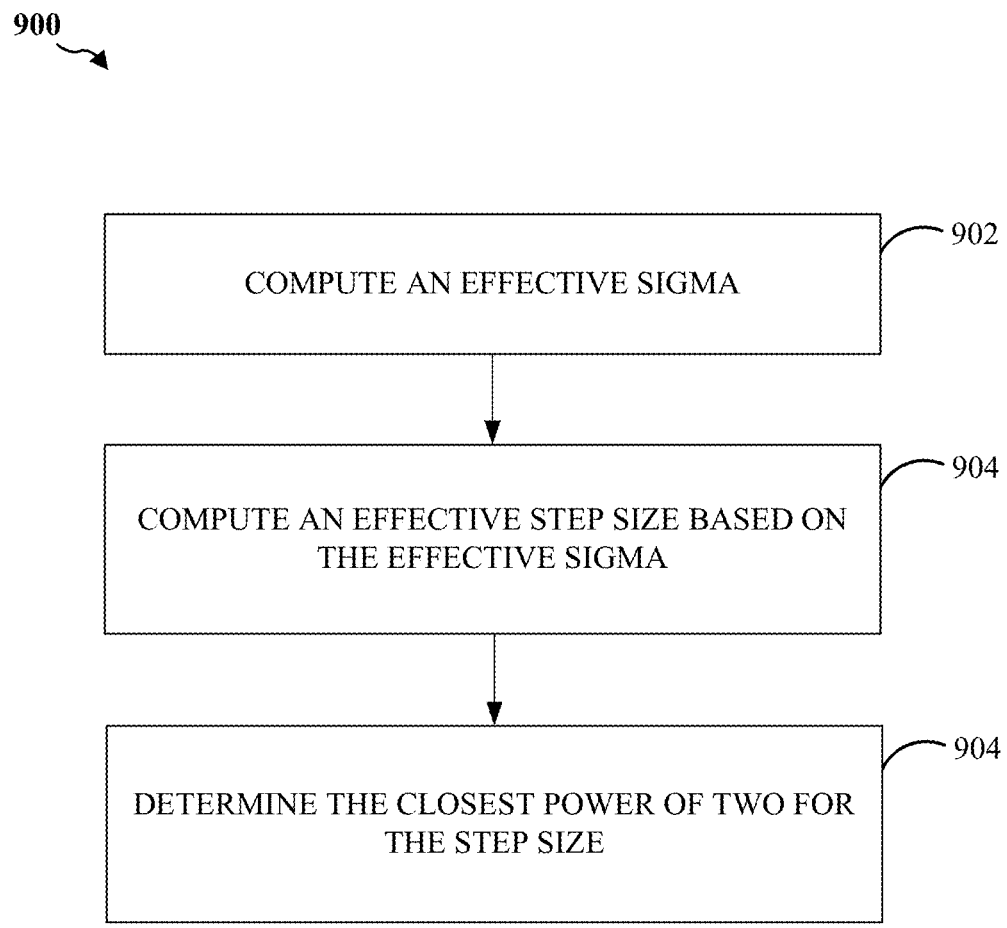
FIG. 9 illustrates a method of determining a step size for a second machine learning network according to a first machine learning network to reduce a computational complexity for the second machine learning network according to aspects of the present disclosure.

FIG. 9 illustrates a method 900 for determining a step size for a second machine learning network (e.g., a fixed point neural network) according to a first machine learning network (e.g., a floating point neural network) to reduce a computational complexity for the second machine learning network according to aspects of the present disclosure. Application of quantization to the weights, biases, and activation values in artificial neural networks includes the determination of a step size. In block 902, an effective sigma is computed. For example, as shown in EQUATION (14) are an absolute value of a mean μ of an input distribution is added to a standard deviation (σ) of the input distribution to compute an effective sigma value (σ'). In block 904, an effective step size ($S_{float}$) is computed based on the effective sigma value (σ'), for example, according to EQUATION (15). In block 906, a closest power of two is determined for the step size, for example, according to EQUATION (16).

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of quantizing a floating point machine learning network to obtain a fixed point machine learning network using a quantizer, comprising:
   selecting a moment of an input distribution of the floating point machine learning network, the moment comprising at least one of a mean or a variance;
   shifting activation values to create a zero-mean distribution for each layer of the fixed point machine learning network;
   shifting a coordinate of any non-linear function applied to a shifted activation value by an amount corresponding to the shifted activation value; and
   quantizing values of the floating point machine learning network based at least in part on quantizer parameters determined from the selected moment of the input distribution of the floating point machine learning network to obtain corresponding values of the fixed point machine learning network.

2. The method of claim 1, in which the quantizer parameters for quantizing values of the floating point machine learning network comprise a maximum dynamic encoding range of the fixed point machine learning network.

3. The method of claim 1, in which the quantizer parameters for quantizing values of the floating point machine learning network comprise a quantizer step size.

4. The method of claim 3, further comprising determining the quantizer step size of the quantizer for bias, weight, and/or activation values based at least in part on a mean value and standard deviation of the bias, the weight, and/or the activation values from the floating point machine learning network.

5. The method of claim 1, in which the quantizer parameters for quantizing values of the floating point machine learning network comprise a bit width.

6. The method of claim 1, in which the quantizer parameters for quantizing values of the floating point machine learning network comprise a signed or unsigned indicator value.

7. The method of claim 1, in which the corresponding values of the fixed point machine learning network comprise a bias, a weight, and/or activation values.

8. A method of converting a first machine learning network to a second machine learning network, comprising:
   obtaining a mean value of a distribution of activation values of the first machine learning network;
   applying the mean value to bias values of the first machine learning network to obtain modified bias values for the second machine learning network, such that activation values for each layer of the second machine learning network have a zero mean distribution; and
   quantizing the activation values stored in a memory based on quantizer parameters.

9. The method of claim 8, further comprising modifying a non-linear activation function when the mean value is incorporated into the bias values.

10. The method of claim 8, in which the first machine learning network comprises a floating point neural network and the second machine learning network comprises a fixed point neural network.

11. An apparatus for quantizing a floating point machine learning network to obtain a fixed point machine learning network using a quantizer, comprising:
- means for selecting a moment of an input distribution of the floating point machine learning network, the moment comprising at least one of a mean or a variance;
- means for shifting activation values to create a zero-mean distribution for each layer of the fixed point machine learning network;
- means for shifting a coordinate of any non-linear function applied to a shifted activation value by an amount corresponding to the shifted activation value; and
- means for quantizing values of the floating point machine learning network based at least in part on quantizer parameters determined from the selected moment of the input distribution of the floating point machine learning network to obtain corresponding values of the fixed point machine learning network.

12. The apparatus of claim 11, in which the quantizer parameters for quantizing values of the floating point machine learning network comprise a maximum dynamic encoding range of the fixed point machine learning network, a bit width, a signed or unsigned indicator value and/or a quantizer step size.

13. The apparatus of claim 12, further comprising means for determining the quantizer step size of the quantizer for bias, weight, and/or activation values based at least in part on a mean value and standard deviation of the bias, the weight, and/or the activation values from the floating point machine learning network.

14. The apparatus of claim 11, in which the corresponding values of the fixed point machine learning network comprise a bias, a weight, and/or activation values.

15. An apparatus for quantizing a floating point machine learning network to obtain a fixed point machine learning network using a quantizer, comprising:
- a memory unit; and
- at least one processor coupled to the memory unit, the at least one processor configured:
  - to select a moment of an input distribution of the floating point machine learning network, the moment comprising at least one of a mean or a variance;
  - to shift activation values to create a zero-mean distribution for each layer of the fixed point machine learning network;
  - to shift a coordinate of any non-linear function applied to a shifted activation value by an amount corresponding to the shifted activation value; and
  - to quantize values of the floating point machine learning network based at least in part on quantizer parameters determined from the selected moment of the input distribution of the floating point machine learning network to obtain corresponding values of the fixed point machine learning network.

16. The apparatus of claim 15, in which the quantizer parameters for quantizing values of the floating point machine learning network comprise a maximum dynamic encoding range of the fixed point machine learning network, a bit width, a signed or unsigned indicator value and/or a quantizer step size.

17. The apparatus of claim 16, in which the at least one processor is further configured to determine the quantizer step size of the quantizer for bias, weight, and/or activation values based at least in part on a mean value and standard deviation of the bias, the weight, and/or the activation values from the floating point machine learning network.

18. The apparatus of claim 15, in which the corresponding values of the fixed point machine learning network comprise a bias, a weight, and/or activation values.

19. A non-transitory computer-readable medium having program code recorded thereon for quantizing a floating point machine learning network to obtain a fixed point machine learning network using a quantizer, the program code being executed by a processor and comprising:
- program code to select a moment of an input distribution of the floating point machine learning network, the moment comprising at least one of a mean or a variance;
- program code to shift activation values to create a zero-mean distribution for each layer of the fixed point machine learning network;
- program code to shift a coordinate of any non-linear function applied to a shifted activation value by an amount corresponding to the shifted activation value; and
- program code to quantize values of the floating point machine learning network based at least in part on quantizer parameters determined from the moment of the input distribution of the floating point machine learning network to obtain corresponding values of the fixed point machine learning network.

20. The computer-readable medium of claim 19, in which the quantizer parameters for quantizing values of the floating point machine learning network comprise a maximum dynamic encoding range of the fixed point machine learning network, a bit width, a signed or unsigned indicator value and/or a quantizer step size.

21. The computer-readable medium of claim 20, further comprising program code to determine the quantizer step size of the quantizer for bias, weight, and/or activation values based at least in part on a mean value and standard deviation of the bias, the weight, and/or the activation values from the floating point machine learning network.

22. The computer-readable medium of claim 19, in which the corresponding values of the fixed point machine learning network comprise a bias, a weight, and/or activation values.

* * * * *